United States Patent [19]

MacDonald

[11] Patent Number: 5,037,858

[45] Date of Patent: Aug. 6, 1991

[54] ANION SELECTIVE POLYMERS PREPARED FROM CONCENTRATED SOLUTIONS OF N,N'-METHYLENEBISACRYLAMIDE

[75] Inventor: Russell J. MacDonald, Watertown, Mass.

[73] Assignee: Ionics, Incorporated, Watertown, Mass.

[21] Appl. No.: 541,854

[22] Filed: Jun. 21, 1990

[51] Int. Cl.$^5$ .............................................. C08F 5/20
[52] U.S. Cl. .................................... 521/38; 524/106; 525/328.4; 526/204; 526/306
[58] Field of Search ................... 526/306; 525/328.4; 521/38

[56] References Cited

U.S. PATENT DOCUMENTS

| | | | |
|---|---|---|---|
| 3,995,998 | 12/1976 | Rowland | 8/115.6 |
| 4,074,039 | 2/1978 | Lim | 526/303 |
| 4,107,057 | 8/1978 | Dill | 252/8.55 C |
| 4,139,684 | 2/1979 | Coupek | 521/27 |
| 4,525,527 | 6/1985 | Takeda | 524/831 |
| 4,664,812 | 5/1987 | Klein | 210/679 |
| 4,908,097 | 3/1990 | Box | 162/9 |

Primary Examiner—Joseph L. Schofer
Assistant Examiner—Fred Zitomer
Attorney, Agent, or Firm—Norman E. Saliba

[57] ABSTRACT

This invention is directed to producing highly concentrated solutions of methylenebisacrylamide and thereafter blending with ionogeneous acrylic monomers to produce low porosity, highly crosslinked, water insoluble polymers for use as anion selective resins and membranes.

7 Claims, No Drawings

ANION SELECTIVE POLYMERS PREPARED FROM CONCENTRATED SOLUTIONS OF N,N'-METHYLENEBISACRYLAMIDE

BACKGROUND OF THE INVENTION

1. Field of the Invention

This invention is directed to producing highly concentrated solutions of the bifunctional monomer methylenebisacrylamide ($CH_2=CHCONH)_2CH_2$, and thereafter blending them with ionogeneous acrylic monomers to produce homogeneous solutions which are polymerized to produce low porosity, highly cross-linked, water insoluble polymers for use as anion selective resins and membranes.

2 Description of the Prior Art

The usual technique for the production of anion selective polymers similar to those described in the invention involves co-polymerizing methacrylate esters containing amine groups of the tertiary type, with cross-linking methacrylate esters (U.S. Pat. No. 4,231,855 Hodgdon et.al.). The resulting polymer with pendant tertiary amine groups is further reacted so that the tertiary amine groups are converted to the quaternary ammonium salts producing an anion selective membrane structure. This prior art has disadvantages in that the polymerization reaction is carried out in non-water soluble organic solvents that have to be washed out with a water soluble alcohol (such as methanol) before the polymer membrane sheet can be subjected to an alkylation step which involves quaternization to the ammonium salt. A further disadvantage of the prior art is the use of the acrylate esters which degrade rapidly in the presence of caustic substances such as sodium hydroxide solutions. The present invention comprises an improvement over methods of the prior art by using water soluble polar solvents and monomers possessing acrylamide groups, (which are only slightly sensitive to caustic solutions) thus excluding the use of acrylate ester groups. Further, the present invention comprises a method to obtain concentrated solutions of methylenebisacrylamide (MBA) in water soluble, polar solvents using caustic as a solubilizing agent. Prior art methods utilizing methylenebisacrylamide are generally limited by the poor solubility of methylenebisacrylamide in the commonly employed solvents.

SUMMARY OF THE INVENTION

The invention comprises preparing highly concentrated solutions of the cross-linker methylenebisacrylamide (MBA) in water soluble polar solvents, then blending water soluble functional acrylic monomers into the solution, resulting in a homogenous solution capable of being polymerized into anion-selective polymers.

The solubility of methylenebisacrylamide in various water soluble, polar solvents as listed in Table I below, was taken from the manufacturer's brochure, (Bulletin PRC-47 American Cyanamide Co.)

TABLE I

| Solvent | MBA "Solubility" g./100 ml. of Solvent | Temperature, °C. |
|---|---|---|
| Water | 2 | 10 |
| " | 3 | 25 |
| " | 6.5 | 50 |
| " | 13 | 70 |

TABLE I-continued

| Solvent | MBA "Solubility" g./100 ml. of Solvent | Temperature, °C. |
|---|---|---|
| Acetone | 1.0 | 30 |
| Butyl cellosolve | 2.5 | 30 |
| Dioxane | 1.1 | 30 |
| Ethanol | 5.4 | 30 |
| Methanol | 8.2 | 30 |

As noted in the Table, the levels of solubility are not sufficient to produce an ion-selective polymer of desired properties i.e. ion-exchange capacity and % water content (porosity) suitable for use as ion-selective resins and membranes. It was however surprisingly found that by addition of small amounts of caustic (such as a sodium hydroxide solution) to a heated slurry of solid and partially dissolved methylenebisacrylamide, causes the solution to become homogeneous and, upon cooling to room temperature, remains homogeneous. This is a novel and totally unexpected result since caustic is known to hydrolyze amide compounds. However, apparently the use of only modest amounts of caustic and the subsequent modest degree of hydrolysis of the methylenebisacrylamide aids in dissolving the remainder of the unhydrolyzed methylenebisacrylamide into the solvent system. The caustic breaks up the hydrogen bonding normally present in the MBA solid and allows the MBA to dissolve. The caustic also causes the MBA to hydrolyze into fragments which will also eventually polymerize as shown below:

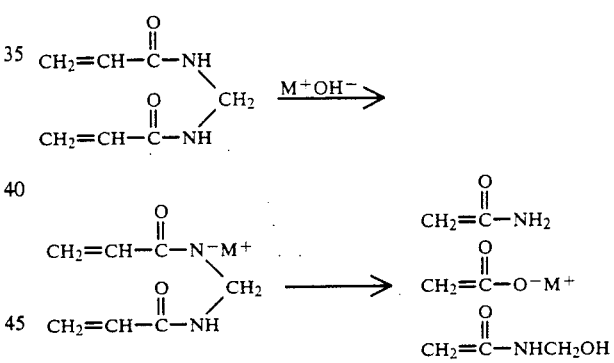

Table II shows the actual solubilities of methylenebisacrylamide in certain solvent systems at 23° C. with and without added caustic. Preferred solvents for use in the present invention include dimethylformamide (DMF) and N-methyl pyrrolidone (NMP).

By blending ionogenous monomers with the concentrated solution of methylenebisacrylamide resulting from caustic addition, one obtains (after polymerization and appropriate work-up) polymers which contain porosity levels and crosslink densities highly suitable for ion-selective polymers.

TABLE II

| Solvent System | System Composition Vol/Vol | MBA "Solubility" g./100 ml. of Solvent System |
|---|---|---|
| DMF | 100 | 12.5 |
| DMF/H$_2$O | 90/10 | 14.3 |
| DMF/1.0 N NaOH | 90/10 | >100 |
| NMP | 100 | 16 |
| NMP/H$_2$O | 90/10 | 18 |

TABLE II-continued

| Solvent System | System Composition Vol/Vol | MBA "Solubility" g./100 ml. of Solvent System |
|---|---|---|
| NMP/1.0 N NaOH | 90/10 | 75 |

To prepare the concentrated methylenebisacrylamide (MBA) solution, a water soluble, polar solvent such as N-methylpyrrolidone (NMP) is heated with the MBA as a slurry preferably to at least 70° C. but no higher than about 110° C. To the solid slurry is added up to a maximum of 7 mole % of a 10 N sodium hydroxide solution relative to the MBA. A clear, homogeneous solution is obtained which can be blended with an acrylic ionomer such as methacrylamidopropyltrimethylammonium chloride (MAPTAC) and cooled to room temperature or first cooled to room temperature and then blended With MAPTAC. A suitable ionogeneous acrylic monomer for use in the present invention is selected from the following:

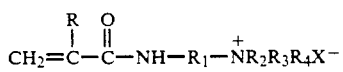

where:
R=H,CH$_3$;
R$_1$=C$_1$-C$_{22}$;
R$_2$,R$_3$,R$_4$=H,CH$_3$,alkyl containing C$_2$-C$_{22}$, benzyl, phenyl; and X$^-$=Cl$^-$,Br$^-$,½SO$_4$=,NO$^-_3$.

The acrylic monomers should comprise between about 25 to 75 mole % based on the total amount of reactant monomers. The preferred ionogeneous acrylic monomer for purposes of this invention includes methacrylamidopropyltrimethylammonium chloride (MAPTAC).

The formula for MAPTAC is as follows:

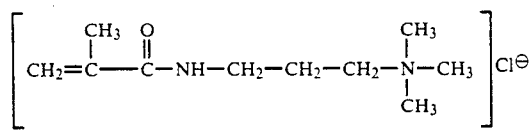

The acrylic monomer may also be selected from the following:

In this latter case the resulting polymer would be post-reacted with an alkylating agent (such as methyl chloride CH$_3$Cl) to form the anion-selective polymer. The preferred monomer in this latter case is dimethylaminopropylmethacrylamide. (DMAPMA)

Suitable water soluble, polar compounds which can be advantageously employed as non-polymerizable (NP) solvents or diluents are especially the amides such as dimethylformamide (DMF), N-methyl pyrrolidone (NMP), 2-pyrrolidone, dimethylacetamide (DMAC), formamide, etc. straight alcohols, polyether alcohols, ketones, carboxylic acids and the like. The volume of water soluble solvent present during polymerization determines the percent porosity and substantially fixes the solvent or water holding capacity or content of the resulting polymer. The solvent or NP employed is typically 20-50% by volume of the final liquid formulation but may be more or less if so desired.

A suitable class of water soluble, free-radical generating compounds which can be used as catalysts for polymerization are both the peroxides and the azo catalysts. The water soluble azo catalyst include for example, 2,2,'-azobis(2-amidinopropane)dihydrochloride (known under the trademark V-50) and 2,2,'-azobis(N,N'-dimethyleneisobutyramidine)dihydrochloride. The water soluble peroxide catalyst include 2,4-pentanedione peroxide, hydrogen peroxide, potassium persulfate and the like. These compounds which serve as free radical initiators, contain an —N=N— group (azo) or —O—O— group (peroxide) attached to aliphatic carbon atoms, at least one of which is tertiary. An amount of 0.01% to 2% of the weight of monomer is usually sufficient.

The anion polymer of the present invention may be synthesized using a wide ratio range of the ionogeneous acrylic monomer to the crosslinking monomer (such as methylenebisacrylamide) but it is preferred that the starting liquid mix comprise anywhere from 0.3 to 0.7 moles of the ionogeneous monomer (preferably 0.5-0.6 moles) to each mole of the cross-linking monomer. The cross-linking monomers that may be employed in the present invention are the alkalenebisacrylamides or alkalenebismethacrylamides which have two or more acryloyl or methacryloyl functional groups; the most preferred being methylenebisacrylamide.

The polymerization reaction may be carried out in the temperature range of about 40° C.-100° C. but the preferred range is between about 60° C.-80° C.

The preferred procedure for preparing the copolymers of this invention is further illustrated by the following examples:

EXAMPLE 1

To 5.8 L of NMP(GAF Chemical Co.) was added 20 lbs. of MBA(American Cyanamid Co.) with stirring and heating to 80° C. 0.4 L of 10 N sodium hydroxide solution was carefully added and heating and stirring was continued until a homogeneous solution was obtained. To the hot solution was added 26 L of a 50% MAPTAC solution(Rohm Tech. Inc.) and then cooled to 30° C. 500 g of Vazo 67(E.I. duPont Co.) 2,2'-asobis-(isovaleronitrile) was added to the solution and stirred until homogeneous. The resulting monomer solution was then poured into an 11"×13"×2" deep rectangular tray into which was laid in alternating fashion, glass plates and 20 mil thick modacrylic cloth until the top of the monomer liquid level was reached. The entire tray was put into an oven at 80° C. and heated for 2 hours. At the end of this period, the entire liquid monomer had turned to a solid mass. The excess resin was chipped from the pan and the glass was removed to yield cloth sheets, 20 mils in thickness surrounded and impregnated with polymerized resin. The resulting membranes were placed in an aqueous sodium chloride solution and later analyzed to give the following properties:
Mullen Burst=140 psi
Thickness=0.054 cm.
Resistivity=9.0 ohm-cm$^2$ (0.01 N NaCl) (1000 Hz)
Water Content=45.6%
Capacity=2.4 Milliquivalents per gram of dry resin

EXAMPLE 2

To 5.8L of NMP was added 20 lbs. of MBA with stirring and heated to 80° C. 0.4 L of 10 N sodium hydroxide solution was added and heating and stirring was continued until a homogeneous solution was obtained. The solution was then cooled to 30° C. and to this solution was added 10L of (DMAPMA) dimethylaminopropyl methacrylamide(Rohm Tech. Inc.) 13 L of water and 500 g of Vazo 67 and stirred until homogeneous. The resulting solution was then poured into a deep rectangular tray and polymerized as in Example 1. The resulting membranes (20 mils thick) were post alkalated by placing in a solution of methyl chloride ($CH_3Cl$) and NMP overnight, then in an aqueous sodium chloride solution and later analyzed to give the following properties:

Mullen Burst = 150 psi
Thickness = 0.054 cm.
Resistivity = 9.7 ohm-$cm^2$ (0.01 N NaCl) (1000 Hz)
Water Content = 46.8%
Capacity = 2.2 Milliequivalents per gram of dry resin While the novel anion selective membranes of this invention can be used especially in connection with electrodialysis and electrolytic systems utilizing alternating anion-exchange membranes and cation exchange membranes, it will be appreciated that the membranes of this invention are equally useful in other types of electrochemical systems. For example, systems are known which utilize only anion-exchange membranes, or neutral(non-permselective) membranes in combination with anion exchange membranes. Such systems, as known in the art, are useful, for example, in double decomposition chemical reactions. The novel anion membranes are also useful in systems involving a plurality of anion- and cation-exchange membranes wherein the said membranes are not present in equal quantities, i.e., where there are more anion-exchange membranes than cation-exchange membranes, or vice versa.

Accordingly, since certain changes may be made without departing from the scope of the invention herein involved, it is intended that all matter contained in the above description shall be interpreted as illustrative and not in a limiting sense.

I claim:

1. A process of preparing an anion exchange polymer by preparing a liquid reaction mixture comprising a cross-linking monomer component of methylenebisacrylamide, an ionogeneous acrylic monomer compound of methacrylamidopropyltrimethylammonium chloride and a water soluble, polar solvent selected from dimethyl foramide, N-methyl pyrrolidone and mixtures thereof, and an amount of hydroxide sufficient to allow said cross-linking monomer to dissolve in said polar solvent in a concentration of between about 75 to 25 mole % based on the total amount of monomer dissolved in said polar solvent.

2. The process of claim 1 wherein an aqueous solution of sodium hydroxide is added to said liquid mixture sufficient to allow said crosslinker to dissolve in the polar solvent in an amount to reach the desired mole % concentration.

3. A process for preparing an anion exchange membrane comprising polymerizing a mixture comprising at least one crosslinking monomer selected from the group consisting of alkylenebisacrylamides and alkalenebismethacrylamides, at least one ionogeneous monomer selected from the group consisting of

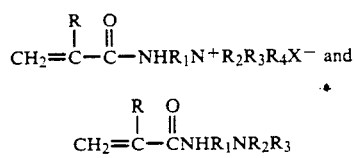

where
$R = H, CH_3$;
$R_1 = C_1$ to $C_{22}$;
$R_2, R_3, R_4 = CH_3$, alkyl containing $C_2$ to $C_{22}$; benzyl, phenyl;
$X^- = Cl^-, Br^-, \frac{1}{2} SO_4^=, NO_3^-$;
and a non-polymerizable diluent comprising as a predominant amount at least one water soluble, polar solvent wherein said mixture comprises from about 25 to about 75 mole percent of said ionogeneous monomer based on the total amount of reactant monomers and wherein said crosslinking monomer has been treated with hydroxide substantially to increase its solubility in said mixture.

4. The process of claim 3 in which said water soluble, polar solvent is selected from the group consisting of amides, straight alcohols, polyether alcohols, ketones and carboxylic acids.

5. The process of claim 3 in which said water soluble, polar solvent is selected from the group of amides consisting of N,N-dimethyl formamide, N-methyl pyrrolidone, 2-pyrrolidone, NN,-dimethyl acetamide and formamide.

6. The process of claim 3 in which said crosslinking monomer is N,N'-methylenebisacrylamide.

7. The process of claim 3 in which said ionogeneous monomer is N-(3-methacrylamidopropyl)-N,N,N-trimethylammonium chloride.

* * * * *